United States Patent [19]

Warfield

[11] Patent Number: 5,611,426
[45] Date of Patent: Mar. 18, 1997

[54] PACKAGING ASSEMBLY FOR COMPACT DISCS

[75] Inventor: Ian R. Warfield, Crystal, Minn.

[73] Assignee: Point Group Corporation, Minneapolis, Minn.

[21] Appl. No.: 542,423

[22] Filed: Oct. 12, 1995

[51] Int. Cl.$^6$ .................................................. B65D 85/57
[52] U.S. Cl. ...................... 206/308.1; 206/309; 206/740; 206/744; 206/756; 206/778; 206/564; 211/40; 211/55
[58] Field of Search .............................. 206/308.1, 309, 206/740, 744, 756, 765, 769, 775, 776, 778, 741, 425, 564; 211/40, 55; 221/130; 312/9, 51; D6/474

[56] References Cited

U.S. PATENT DOCUMENTS

| | | | |
|---|---|---|---|
| 1,977,466 | 10/1934 | Bohnke | 206/741 |
| 2,103,241 | 12/1937 | Bell | 206/564 |
| 3,308,934 | 3/1967 | Reiner . | |
| 3,429,427 | 2/1969 | Wolf . | |
| 3,768,639 | 10/1973 | Dogliotti | 206/564 |
| 5,015,331 | 10/1988 | Ferraroni . | |
| 5,039,376 | 11/1989 | Carlton . | |
| 5,061,359 | 8/1990 | Tompkins . | |
| 5,102,523 | 12/1992 | Whitehead et al. . | |
| 5,157,000 | 4/1992 | Krattiger . | |
| 5,170,893 | 12/1992 | Smith | 206/308.1 |
| 5,252,178 | 6/1992 | Olivas . | |
| 5,253,751 | 10/1993 | Wipper . | |
| 5,279,097 | 1/1994 | Weisburn et al. . | |
| 5,375,706 | 12/1994 | Perez | 206/308.1 |
| 5,383,554 | 1/1995 | Cowan . | |
| 5,411,135 | 5/1995 | Danzyger et al. . | |
| 5,415,291 | 5/1995 | Fukagawa . | |
| 5,415,298 | 5/1995 | Callahan et al. . | |
| 5,533,614 | 7/1996 | Walker | 206/308.1 |

*Primary Examiner*—David T. Fidei
*Attorney, Agent, or Firm*—Plevy & Associates

[57] ABSTRACT

A packaging assembly for both packaging and displaying a plurality of compact discs. The packaging assembly includes a support structure having tiered depressions formed into at least one row. Each depression in a row is sized to accept a compact disc and includes a retaining mechanism for selectively engaging a compact disc at each tier level. As a result, the support structure is capable of retaining multiple compact discs in each row, wherein each compact disc is retained at a different tier level. This enables the various compact discs to overlay over another without contacting one another. The tiered orientation also enables any one of the compact discs to be accessed without having to remove any other compact disc contained in the packaging assembly. The support structure itself is contained within a box, wherein the box has a forward surface that defines a large window. When the support structure is contained within the box, each compact disc retained on the support structure is visible through the box window. Accordingly, the number of compact discs contained within the packaging assembly is instantly discernable as is the identifying graphics and/or indicia printed on each of the compact discs.

19 Claims, 3 Drawing Sheets

PACKAGING ASSEMBLY FOR COMPACT DISCS

BACKGROUND OF THE INVENTION

1. Field of the Invention

The present invention relates to packaging assemblies for use in the packaging of multiple compact discs. More particularly, the present invention relates to packaging assemblies for packaging multiple compact discs, wherein each of the compact discs contained within the packaging assembly is visibly displayed.

2. Discussion of the Prior Art

Compact discs are becoming a standard recording medium upon which commercially available computer software and music are sold. Traditionally, compact discs have been individually packaged in protective plastic cases such as that exemplified by U.S. Pat. No. 5,279,097 to Weisburn et al., entitled CONTAINER FOR COMPACT DISC. Such compact disc packaging provides adequate shipping protection to the compact disc. However, the labeling used in such packaging usually prevents the actual compact disc from being viewed until the packaging is open.

Conventional compact discs only have one side upon which data is recorded. The opposite side of the compact disc is blank and its typically covered with colorful graphics or indicia explaining the data contained on the compact disc. Recognizing that the graphics and indicia printed directly on the compact disc have aesthetic valve and market appeal, packaging has been developed that displays the compact disc directly along with any printed material sold with the compact disc. Such prior art packaging is exemplified by U.S. Pat. No. 5,253,751 to Wipper, entitled PACKAGING FOR COMPACT DISCS. However, such packaging assemblies are designed to display only a single compact disc.

Many commercially available computer programs, data base collections, music collections and the like are often too large to be contained on a single compact disc. As such, multiple compact discs are packaged together and sold as a unit. In the prior art, multiple compact discs that are sold together are typically individually wrapped and packaged in a common box. Consequently, the consumer is prevented from directly viewing the compact discs contained within the packing. As a result, when consumers purchase such a package box, they often do not know how many compact discs are contained within that box.

In marketing, various compact discs are compiled and are sold as a "variety pack", wherein certain compact discs normally sold separately are sold together. When packaging a variety pack, it is highly desirable to show the consumer exactly how many compact discs are contained within the collection and identify what each of the compact discs contain. In the prior art, variety packs contain individually wrapped compact discs contained in a common box. As a result, the manufacturer relies solely on the packaging graphics contained on the box to explain the contents of the variety pack. This requires a consumer to stop and read the packaging box of the variety pack in order to determine its contents.

It is therefore an object of the present invention satisfy the need in the art for a packaging assembly for multiple compact discs that directly displays each of the compact discs, thereby enabling consumer to directly see how many compact discs are contained in the packaging and identify which compact discs are provided.

It is a further object of the present invention to provide a packaging assembly, as explained above, that retains multiple compact discs in a space efficient manner that minimizes packaging waste.

SUMMARY OF THE INVENTION

The present invention is a packaging assembly for both packaging and displaying a plurality of compact discs. The packaging assembly includes a support structure having tiered depressions formed into at least one row. Each depression in a row is sized to accept a compact disc and includes a retaining means for selectively engaging and retaining a compact disc at each tier level. As a result, the support structure is capable of retaining multiple compact discs in each row, wherein each compact disc is retained at a different tier level. This enables the various compact discs to overlay over another without contacting one another. The tiered orientation also enables any one of the compact discs to be accessed without having to remove any other compact disc contained in the packaging assembly. The support structure itself is contained within a box, wherein the box has a forward surface that defines a large window. When the support structure is contained within the box, each compact disc retained on the support structure is visible through the box window. Accordingly, the number of compact discs contained within the packaging assembly is instantly discernable as is the identifying graphics and/or indicia printed on each of the compact discs.

BRIEF DESCRIPTION OF THE DRAWING

For a better understanding of the present invention, reference is made to the following description of an exemplary embodiment thereof, considered in conjunction with the accompanying drawings, in which.

DETAILED DESCRIPTION OF THE DRAWINGS

Figure 1:
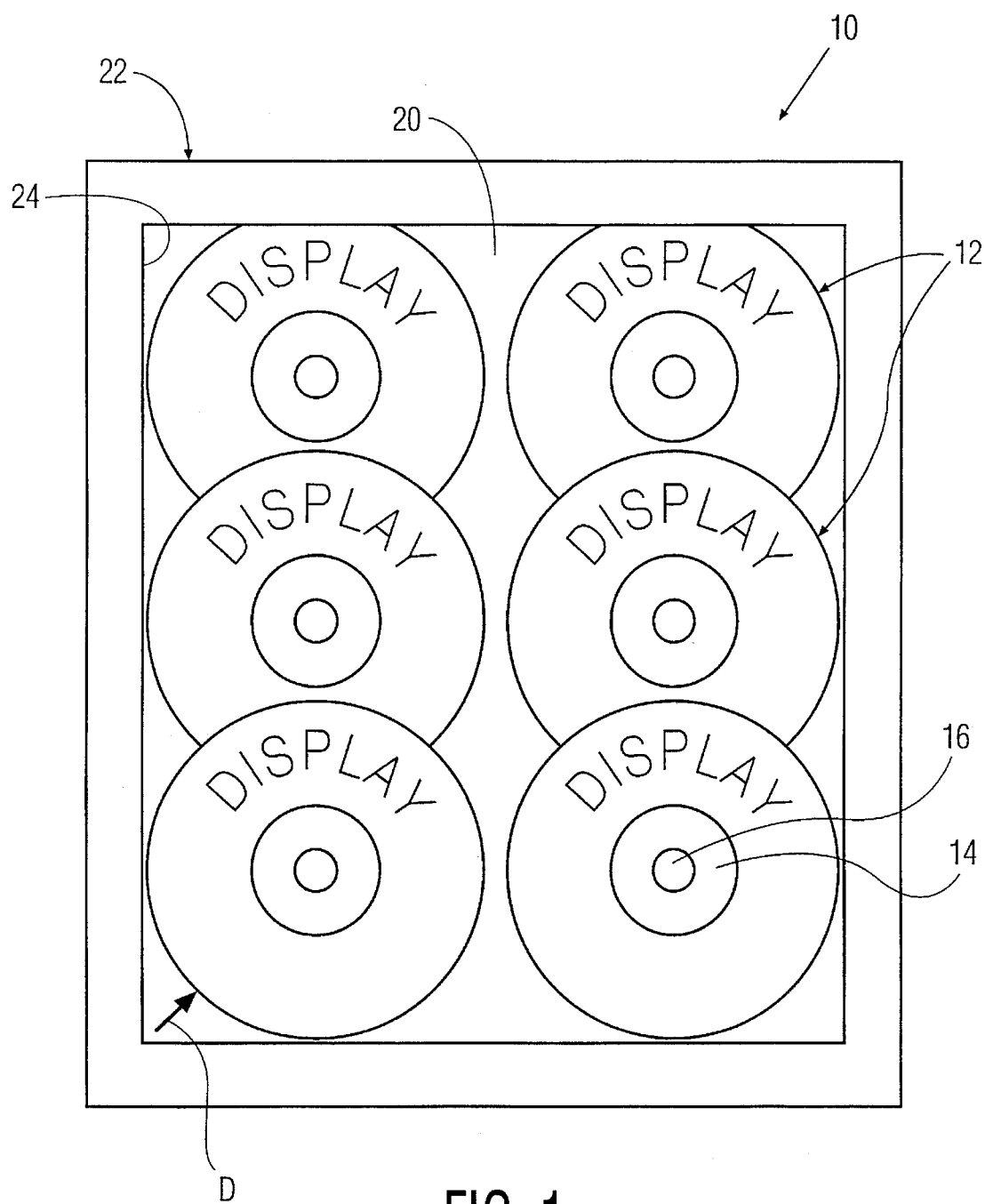
FIG. 1 is a top view of one preferred embodiment of the present invention packaging assembly.

Referring to FIG. 1, a preferred embodiment of the present invention compact disc packaging assembly 10 is shown that is capable of holding six compact discs 12. As will be explained, the shown configuration of the compact disc packaging assembly 10 is merely exemplary and the present invention can be configured to retain any plurality of compact discs, not just the six compact discs shown.

As a well known, compact discs 12 are manufactured in a standard size having as overall diameter D of approximately fifteen centimeters, a blank central region 14 with a diameter of approximately four centimeters and a central aperture 16 of approximately one and a half centimeters. In FIG. 1, the shown packaging assembly 10 includes a tiered support 20 contained within a paperboard box 22 having a large forward window 24. As will be further explained the tiered support 20 retains a plurality of compact discs 12 in a tiered orientation so that each of the compact discs 12 are visible through the forward window 24 in the paperboard box 22. A plastic shrink wrap film (not shown) is applied around the paperboard box 22, wherein the shrink wrap film extends across the forward window 24, seals the paperboard box 22 and prevents a person from touching the compact discs 12 through the forward window 24. By providing such a packaging assembly 10, a plurality of compact discs 12 can be displayed without each of the compact discs 12 having to be individually packaged. Furthermore, each of the compact discs is visible within the packaging assembly 10, thereby letting the indicia printed on the compact discs 12 to be used to directly identify the compact discs 12. By eliminating the need for individual packaging and providing a tiered display, an overall packaging assembly 10 is provided that minimizes packaging waste, yet is aesthetically pleasing. The packaging assembly 10 also allows each and every compact disc 12 to be directly viewed, thus providing a highly informative display that is particularly well suited for displaying variety pack collections of compact discs.

Figure 2:
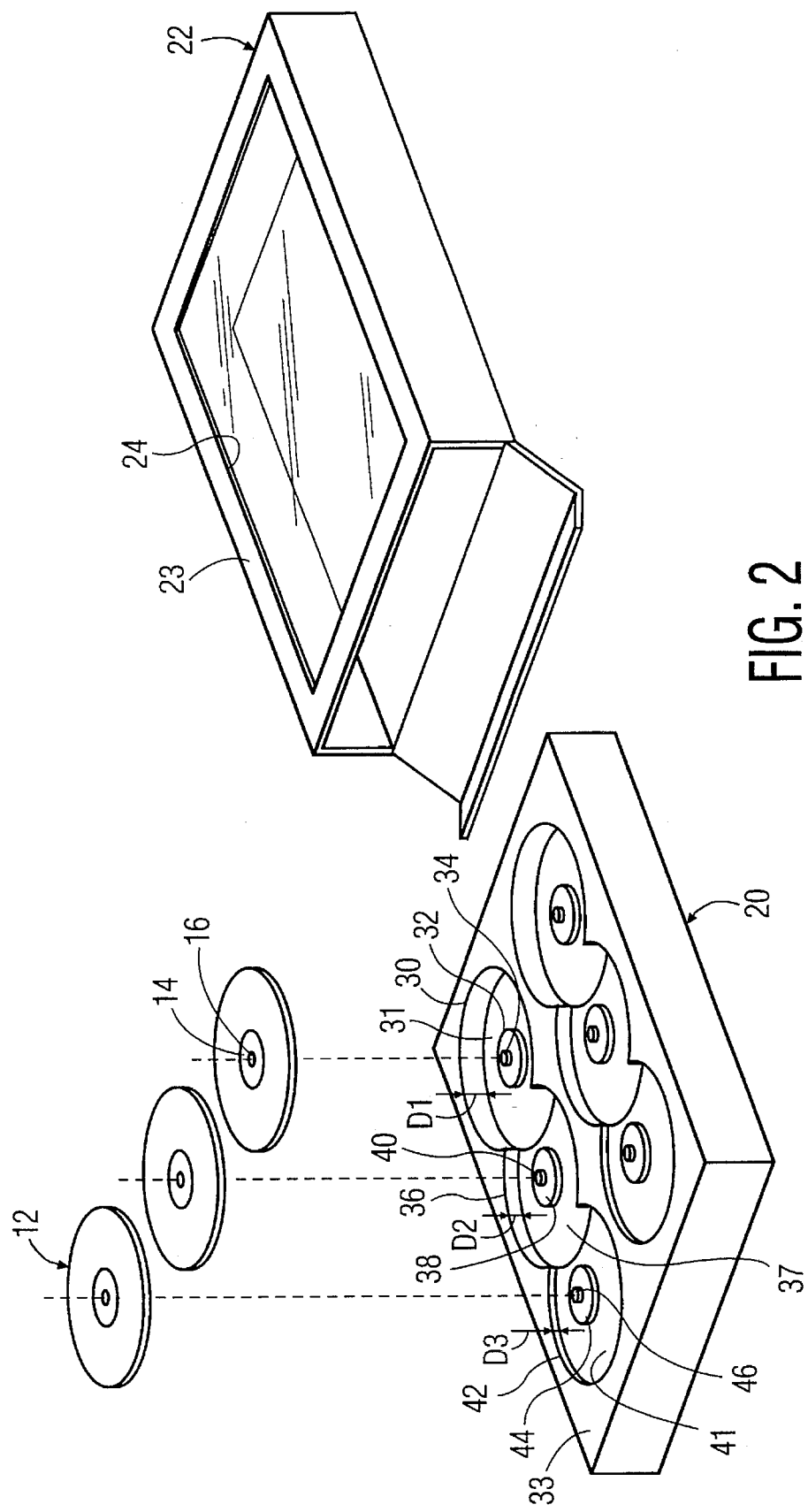
FIG. 2 is a perspective exploded view of the embodiment of FIG. 1.

Referring to FIG. 2, it can be seen that the paperboard box 22 has at least one openable surface through which the tiered support 20 can be moved into, and removed from, the interior of the paperboard box 22. The length, width and height of the paperboard box 22 are all dependent upon the dimensions of the tiered support 20, wherein the interior dimensions of the paperboard box 22 are only slightly larger than the major exterior dimensions of the tiered support 20. The window 24 defined by the forward wall 23 of the paperboard box 22 can be any size, provided the window 24 is large enough to enable a person looking at the packaging assembly 10 to view at least fifty percent of the surface area of each compact disc 12 left exposed on the tiered support 20.

Figure 3:
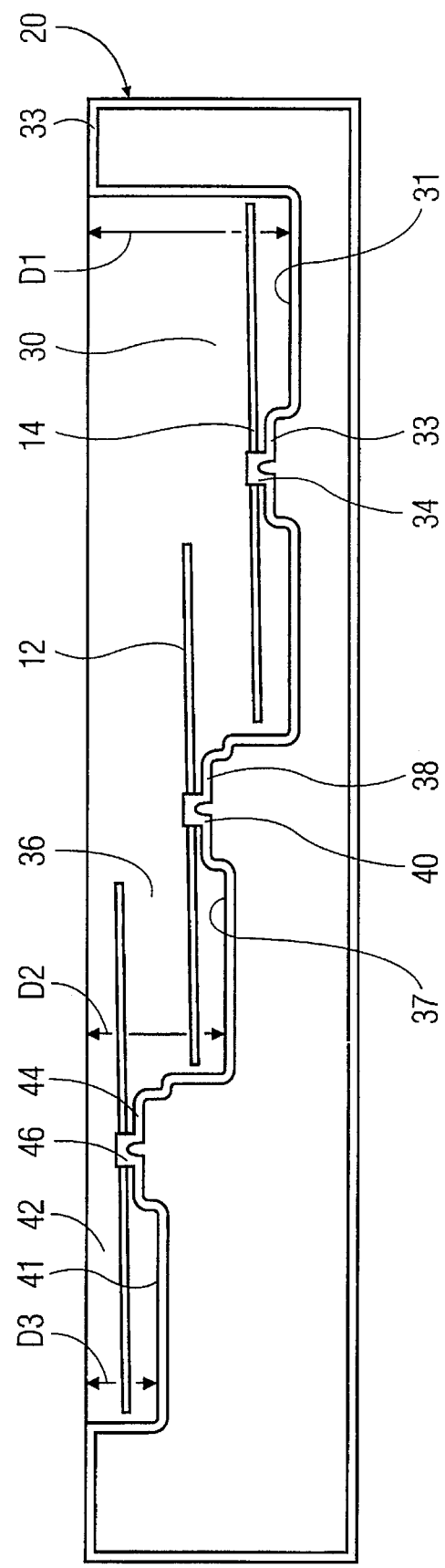
FIG. 3 is a cross sectional view of the tiered support shown in FIG. 2, viewed along with section line 3—3.

Referring to FIG. 3 in conjunction with FIG. 2, it can be seen that the tiered support 20 is unistructurally molded and is configured to retain three compact discs 12 in each of two rows. In the shown embodiment, a first round depression 30 is formed a predetermined depth D1 below the top surface 33 of the tiered support 20. The first round depression 30 has a diameter just slightly larger than the overall diameter D of a compact disc 12, thereby enabling the first round depression 30 to receive one of the compact discs 12. A round support plateau 32 extends upwardly from the center of the bottom surface 31 of the first round depression 30. The round support plateau 32 engages the blank central region 14 of the compact disc 12, thereby supporting the compact disc 12 slightly above the bottom surface 31 of the first round depression 30. A locking protrusion 34 extends upwardly from the center of the support plateau 32. The diameter of the locking protrusion 34 is slightly larger than the diameter of the central aperture 16 of the compact disc 12. Accordingly, as the central aperture 16 of a compact disc 12 is pushed onto the locking protrusion 34, an interference fit occurs that acts to selectively retain the compact disc 12 in a set orientation.

The second depression 36 in each row of the tiered support 20 is crescent shaped, having a bottom surface 37 that is set at a depth D2 below the top surface 33 of the tiered support 20. As with the previously described first depression 30, the second depression 36 has a diameter sized to receive a compact disc 12. Similarly, a support plateau 38 extends upwardly from the bottom surface 37 of the second depression 36 and a locking protrusion 40 extends from the support plateau 38. The first depression 30 intersects the area of the second depression 36 in such a manner that the round periphery of the first depression 30 overlaps the second depression 36. As such, the presence of the first depression 30 causes the bottom surface 37 of the second depression 36 to be crescent shaped.

By limiting the overlap between adjacent depressions to a configuration where the locking protrusion 40 is not disrupted, two purposes are served. First, by having a fully round locking protrusion 40, a full engagement of a compact disc 12 by the locking protrusion 40 can be ensured. Secondly, since a compact disc 12 placed in the second depression 36 would not overlap the locking protrusion 34 in the first depression 30, a compact disc 12 can be added to or removed from the first depression 30 regardless to whether a compact disc is present in the second depression 36. The degree of the overlap between adjacent depressions can be varied depending upon how much of each of the compact discs 12 the manufacture would like to have exposed. The maximum overlap possible would be when the peripheral edge of one depression lays tangent to the locking protrusion of an adjacent depression. In such an orientation, the overlap is maximized without effecting the various locking protrusions or their ability to retain the compact discs.

The difference in depth between the first depression 30 and the second depression 36 is sized so that the compact discs 12 retained in each of the depressions do not contact one another. Accordingly, the only segment of a compact disc 12 that is physically engaged within the packaging assembly 10 is the blank central region 14 of the compact disc 12 that rests upon the support plateaus within the various depressions.

The third depression 42 in each row of the tiered support 20 is crescent shaped in the same manner as the second depression 36. The third depression 42 has a bottom surface 41 that is set a depth D3 below the top surface 33 of the tiered support 20. The third depression 40 is sized to receive a compact disc 12 and contains both a support plateau 44 and a round locking protrusion 46. The second depression 36 overlaps the third depression 42 to the same degree as the first depression 30 overlaps the second depression 42. As such, a compact disc placed in the second depression 36 would be accessible regardless to the presence of a compact disc in the first depression. The difference in depth between the second depression 36 and the third depression 42 is set so that a compact disc 12 retained in the third depression 42 would not contact the compact disc 12 retained in the second depression.

In FIG. 2, optional finger reliefs 50 are shown molded into the tiered support 20. The finger reliefs 50 enable a person to easily engage the peripheral edge of a compact disc 12, even when that disc is retained in the deepest of the depressions.

From FIG. 3 it can be seen that the tiered support 20 itself is molded with side walls 60. The height of the sidewalls 60 are generally the same size as the height if the interior of the paperboard box 22 (FIG. 1). As a result, when the tiered support 20 is retained within the paperboard box, there is a large volume of unused spaced contained under the top surface 33 and between the walls 60 of the tiered support 20. This space can be used to retain operating instructions, manuals, lyric sheets or the like that would otherwise accompany the compact discs 12 if they were individually packaged.

It will be understood that the shown embodiment having two rows of depressions, each capable of holding three compact discs, is merely exemplary. The present invention packaging assembly could be one row or any plurality of rows, and each row could have any plurality of CD retaining depressions. All such variations and modifications are intended to be included within the scope of this invention as defined by the appended claims.

What is claimed is:

1. A packaging assembly for packaging a plurality of compact discs, comprising:

a box having a front surface, wherein said front surface defines a window through which an interior region of said box can be viewed;

an insert member removably positionable in said box, said insert member having a top surface with a plurality of disc accommodating areas;

retaining means associated with each of said disc accommodating areas for retaining one of said plurality of compact discs at each of said disc accommodating areas, whereby each of said plurality of compact discs is visible through said window of said box and partially overlaps an adjacent one.

2. The packaging assembly according to claim 1, wherein said retaining means retains said plurality of compact discs in at least one row.

3. The packaging assembly according to claim 2, wherein said insert member is tiered so that said disc accommodating areas are at multiple levels, and said retaining means are disposed at each of said multiple levels, whereby said retaining means retains at least one of said plurality of compact discs at each of said multiple levels.

4. The packaging assembly according to claim 2, wherein each of said retaining means retains each of said plurality of compact discs at an isolated position, whereby said plurality of compact discs do not contact each other.

5. A packaging assembly for packaging a plurality of compact discs, comprising:

a box having a front surface, wherein said front surface defines a window through which an interior region of said box can be viewed;

an insert member removably positionable in said box;

retaining means disposed on said insert member for retaining said plurality of compact discs in an orientation wherein each of said plurality of compact discs is visible through said window of said box, wherein said retaining means retains said plurality of compact discs in at least one row, wherein each of said plurality of compact discs in said at least one row appear to partially overlap an adjacent compact disc in said at least one row when viewed through said window of said box, wherein each of said plurality of compact discs have a central aperture and said retaining means includes protrusions disposed on said insert member that are shaped to selectively engage said central aperture, thereby engaging said plurality of compact discs and selectively joining said plurality of compact discs to said insert member.

6. The packaging assembly according to claim 5, wherein each of said protrusions are visible through said window of said box.

7. A device for retaining a plurality of compact discs of the type having a peripheral edge, a blank center region and a useable region disposed between the peripheral edge and the blank center region on a first side, said device comprising:

a support structure having a top surface;

a plurality of depressions disposed in said top surface, wherein each of said plurality of depressions is sized to accept a compact disc therein; and retaining means disposed in each of said plurality of depressions for selectively retaining said plurality of compact discs in said plurality of depressions, whereby each of said plurality of compact discs overlaps an adjacent one.

8. The device according to claim 7, wherein said depressions are aligned in at least one row and each of said depressions in a row is set at a different depth from said top surface.

9. The device according to claim 8, wherein at least one of said plurality of compact discs retained in each said row overlaps another of said plurality of compact discs retained in said row.

10. The device according to claim 9, wherein a majority of the useable region of each of said plurality of compact discs is viewable from said top surface of said support structure.

11. The device according to claim 9, wherein said retaining means retains each of said plurality of compact discs in an isolated position, whereby the compact discs in said at least one row do not contact each other.

12. The device according to claim 8, wherein said retaining means includes protrusions disposed on said support structure in said depressions that are shaped to selectively engage the blank center region of each said plurality of compact discs, thereby selectively joining said plurality of compact discs to said support structure.

13. The device according to claim 7, further including a box, positionable around said support structure, said box defining a window through which all of said plurality of said compact discs can be viewed.

14. A packaging assembly for compact discs, comprising:

a tiered support structure having a plurality of tiers set a different depth from a top surface of said support structure;

means disposed on each of said tiers for retaining a compact disc, wherein said compact discs are retained in a substantially parallel orientation with respect to said top surface; and a box positionable around said tiered support structure, said box defining a window though which each said compact disc on said tiered support can be viewed.

15. The packaging assembly according to claim 14, wherein compact discs on adjacent tiers overlap on another.

16. The packaging assembly according to claim 15, wherein compact discs are physically isolated from one another.

17. The packaging assembly according to claim 1, wherein said compact discs are retained in a substantially parallel orientation with respect to said top surface.

18. The packaging assembly according to claim 1, which further includes supporting means associated with each of said disc accommodating areas for supporting one of said plurality of compact discs at each of said disc accommodating areas.

19. The device according to claim 1, wherein said plurality of compact discs are retained in said plurality of depressions in a substantially parallel orientation with respect to said top surface.

* * * * *